United States Patent [19]
Shah

[11] 3,922,282
[45] Nov. 25, 1975

[54] 2-ARYL-2-IMIDAZOLINE-1-PROPIONIC ACIDS AND THEIR ESTERS

[75] Inventor: Harshavadan C. Shah, Secane, Pa.

[73] Assignee: American Home Products Corporation, New York, N.Y.

[22] Filed: Jan. 17, 1975

[21] Appl. No.: 541,904

[52] U.S. Cl. ............. 260/309.6; 260/470; 424/273
[51] Int. Cl.² .......................................... C07D 49/34
[58] Field of Search ................................. 260/309.6

[56] References Cited
UNITED STATES PATENTS
3,754,002  8/1973  Brown .......................... 260/309.6

OTHER PUBLICATIONS

Chem. Abstracts, 74:3552v.

Primary Examiner—Ethel G. Love
Attorney, Agent, or Firm—Robert Wiser

[57] ABSTRACT

2-Aryl-2-imidazoline-1-propionic acids, their esters and salts are disclosed. These compounds exhibit antagonism to reserpine induced ptosis in warm-blooded animals as evidenced by standard pharmacological testing procedures.

7 Claims, No Drawings

2-ARYL-2-IMIDAZOLINE-1-PROPIONIC ACIDS AND THEIR ESTERS

BACKGROUND OF THE INVENTION

The starting materials for preparing the compounds of the instant invention are chlorine substituted o-imidazoanilines. The preparation of unsubstituted o-imidazoaniline has been reported [for example South African Patent 64/3592, Swiss Patent 452,537 and Zh. Prikl. Khim. 43, 1641 (1970)]. Substituted o-imidazoanilines are, however, absent from the organic chemical literature, as are their derivatives which are herein described.

SUMMARY OF THE INVENTION

The invention sought to be patented resides in the concept of a chemical compound of the formula:

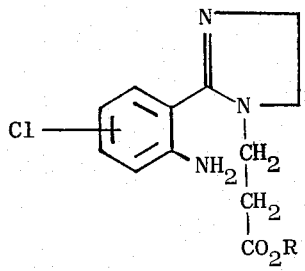

wherein R is hydrogen or alkyl of from 1 to 6 carbon atoms, and the pharmacologically acceptable addition salts thereof.

The tangible embodiments of the compositions of the invention possess the inherent general physical properties of being off-white to white colored solids; the free forms are substantially insoluble in water and are generally soluble in organic solvents such as ethyl alcohol, and the salt forms are generally soluble in water. Examination of compounds produced according to the hereinafter described process reveals, upon infrared and nuclear magnetic resonance spectrographic analysis, spectral data supporting the molecular structures herein set forth. The aforementioned physical characteristics, taken together with the nature of the starting materials, the elemental analyses, and the mode of synthesis, confirm the structure of the compositions sought to be patented.

The tangible embodiments of the compositions of the invention possess the inherent applied use characteristic of exhibiting antagonism to reserpine induced ptosis, and, when R is hydrogen and the chlorine substituent is para to the amino substituent, hypoglycemic effects, upon administration to warm-blooded animals. These effects are evidenced by pharmacological evaluation according to standard test procedures.

The invention sought to be patented in its first sub-generic composition aspect resides in the concept of a chemical compound of the formula:

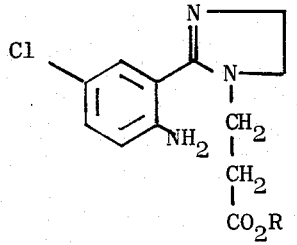

wherein R is hydrogen or alkyl of from 1 to 6 carbon atoms, and the pharmacologically acceptable addition salts thereof.

The tangible embodiments of the compositions of the first sub-generic aspect of the invention possess the inherent applied use characteristic of exhibiting antagonism to reserpine induced ptosis, and in addition, hypoglycemic effects when R is hydrogen, upon administration to warm-blooded animals. These effects are evidenced by pharmacological evaluation according to standard test procedures.

The invention sought to be patented in its second sub-generic composition aspect resides in the concept of a chemical compound of the formula:

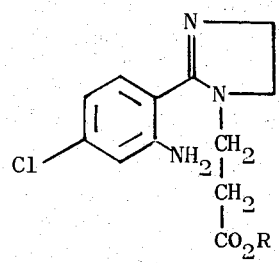

wherein R is hydrogen or alkyl of from 1 to 6 carbon atoms, and the pharmacologically acceptable addition salts thereof.

The tangible embodiments of the compositions of the second sub-generic aspect of the invention possess the inherent applied use characteristic of exhibiting antagonism to reserpine induced ptosis upon administration to warm-blooded animals. These effects are evidenced by pharmacological evaluation according to standard test procedures.

DESCRIPTION OF THE PREFERRED EMBODIMENTS

The compounds of the invention are prepared by condensing a chlorine substituted o-imidazoaniline with acrylamide. This condensation has been found to proceed efficiently in a solution of aqueous mineral acid at reflux temperature for from about 2 to about 8 hours (ideally from 2 ½ to 5 hours). Any of the various mineral acids are suitable for this process, however, hydrochloric acid is the preferred acid for this reaction.

After the reflux period, the reaction mixture is allowed to cool and is then basified with for example, aqueous sodium hydroxide or ammonium hydroxide to ca. pH 8–9, and the product of the reaction is isolated from this aqueous mixture and purified by, for example, evaporation of the solvent and recrystallization of the residue. By this procedure the free acid forms of the compositions of the invention are prepared, and if desired, these acids may be converted to esters by, for example, treatment with thionyl chloride producing the corresponding acid chloride followed by reaction with a lower alkanol such as methanol or ethanol. These esters may be purified by, for example, recrystallization.

The compounds of the invention which bear a carboxyl group may be converted to an alkali metal salt such as a sodium or potassium salt or a salt of a pharmacologically acceptable basic amine such as triethylamine or ammonia. All such salts are full equivalents of the subject matter particularly claimed. In addition, all of the compositions of the invention may be converted to acid addition salts of a pharmacologically acceptable acid such as hydrochloric, sulfuric, fumaric and the like.

The in vivo anti-reserpine activity data is obtained, following the procedure of Rubin et al., *J. Pharm. and Exper. Therap.* 120:125, 1957, by administering the compositions of the invention at 1 and 10 mg/kg. body weight dose levels to groups of six mice (3 males and 3 females). One hour later the animals are challenged with reserpine, 2.5 mg/kg. body weight, intraperitoneally. The degree of ptosis for each eye-lid is determined one hour after administration of reserpine. Control groups of animals are simultaneously run. The particular dosage required to elicit reversal of reserpine induced ptosis will vary with the particular compound employed, the particular animal involved, and the chosen route of administration. Thus in the mouse by oral administration, the dose which demonstrates this anti-reserpine activity is from about 2 mg/kg. to about 100 mg/kg. and preferably from about 2 mg/kg. to about 50 mg/kg. The results obtained for compositions of the invention using the above described procedure are expressed below as the $ED_{50}$ needed to statistically reverse reserpine induced ptosis of the eyelid in milligrams per kilogram hose body weight.

| Compound | $ED_{50}$ (p.o.) |
|---|---|
| 2-(2-amino-5-chlorophenyl)-2-imidazoline-1-propionic acid, hydrochloride | 2.35 |
| 2-(2-amino-5-chlorophenyl)-2-imidazoline-1-propionic acid methyl ester, hydrochloride | 10 |
| 2-(2-amino-4-chlorophenyl)-2-imidazoline-1-propionic acid, hydrochloride | 10 |

The in vivo hypoglycemic activity is obtained following the below described procedure:

Male rats weighing 170–200 grams are fasted overnight, a control blood sample is taken from the tail and a test dose of 60 mg/kg. of the compound being tested is administered by stomach tube. Subsequent blood samples are taken at hourly intervals for five hours, and assayed for glucose content.

In general, a compound is considered active if a depression in blood sugar approximating at least 20% is observed for at least three of the five test periods.

The particular dosage required to obtain hypoglycemic activity will vary with the particular compound employed, the particular animal involved, and the chosen route of administration. Using the above-described procedure, 2-(2-amino-5-chlorophenyl)-2-imidazoline-1-propionic acid, hydrochloride, demonstrates hypoglycemic activity at a dose of 60 mg/kg.

The following examples further illustrate the best mode contemplated by the inventor for the practice of the invention.

EXAMPLE 1

Preparation of Imidazo Aniline Starting Materials

The imidazo aniline starting materials are produced by condensing the appropriate chlorine substituted methyl anthranilate with an aromatic sulfonylchloride such as p-methoxy benzene sulfonyl chloride followed by reaction with sym-diamino ethane to obtain the corresponding chlorine substituted 2-imidazolin-2-yl-N-(4-methoxybenzenesulfonyl)aniline derivatives which are desulfonylated to afford the 2-imidazol-2-yl aniline precursors. The preparation of the imidazo aniline precursors is exemplified as follows:

Dissolve 15 grams of 4-chloro methyl anthranilate in pyridine (15 milliliters) and benzene (100 milliliters) and add a stoichiometric amount of p-methoxybenzenesulfonyl chloride. After standing for four hours the precipitate is removed by filtration, washed with benzene and the filtrate evaporated to dryness. Recrystallization of the residue gives the corresponding p-methoxybenzenesulfonamide. Reflux the product (5.0 grams) overnight with sym-diamino ethane (50 milliliters). Remove the excess diamine under vacuum and heat the residue at 170°–190° C. on an oil bath stripping at 0.5 millimeters Hg vacuum. The contents of the flask is recrystallized from ethanol-benzene to provide 2'(2-imidazolin-2-yl)4'-chloro-4-methoxy benzene sulfonanilide, which is desulfonylated by heating on a steam bath overnight with 92 percent $H_2SO_4$ (102 milliliters concentrated $H_2SO_4$ plus 12 milliliters $H_2O$) followed by cooling and pouring the product into ice water containing excess $NH_4OH$. Extract with methylene chloride, dry and remove the solvent to obtain 2-(2-amino-5-chlorophenyl)-2-imidazoline. The corresponding imidazoline precursors variously substituted with chlorine are prepared in the same way by employing the correspondingly substituted chloro methyl anthranilate as the reactant. Likewise, benzene sulfonyl chlorides in general may be employed in lieu of the p-methoxybenzene sulfonyl chloride specifically employed herein.

EXAMPLE 2

2-(2-Amino-5-Chlorophenyl)-2-Imidazoline-1-Propionic Acid, Hydrochloride

Reflux 2-(2-amino-5-chlorophenyl)-2-imidazoline (1.95 g.) and acrylamide (1.1 g.) in 4 ml. of water and 2 ml. concentrated hydrochloric acid for 2 ½ hours. Cool and add concentrated ammonium hydroxide (pH around 9). Extract with dichloromethane. Allow the aqueous to stand overnight. Collect the solid (2.3 g.), m.p. 208°–213°. Suspend the solid in water, add 4 drops of concentrated hydrochloric acid (pH around 2). Remove water in vacuo. Recrystallize the residue from methanol ether to get 2-(2-amino-5-chlorophenyl)-2-imidazoline-1-propionic acid, hydrochloride (1.2 g.), m.p. 195°–198°, $\lambda_{max}^{KBr}$ 3.3, 5.75, 6.35 $\mu$.

Analysis for: $C_{12}H_{14}N_3ClO_2 \cdot 2HCl$; calculated: C, 42.62; H, 4.73; N, 12.33; Cl, 31.22; Found: C, 42.60; H, 4.70; N, 12.34; Cl, 30.97.

EXAMPLE 3

2-(2-Amino-5-Chlorophenyl)-2-Imidazoline-1-Propionic Acid Methyl Ester, Hydrochloride Reflux 2-(2-amino-5-chlorophenyl)-2-imidazoline-1-propionic acid, hydrochloride (1.8 g.) with thionyl chloride (about 50 ml.) for three hours. Remove excess in vacuo. Azeotrope with toluene. Add methanol and excess ether. Collect the solid (1.0 g.). Dissolve in methanol and heat on a steam bath with Nuchar. Filter. Remove some solvent in vacuo. Add isopropanolic hydrogen chloride. Filter. Add excess ether. Filter and wash with ether, petroleum ether to get 2-(2-amino-5-chlorophenyl)-2-imidazoline-1-propionic acid methyl ester, hydrochloride (700 mg.), m.p. 242°–244°, $\lambda_{max}^{KBr}$ 3.3, 5.7, 6.3, 6.6 μ.

Analysis for: $C_{13}H_{16}N_3ClO_2 \cdot HCl$; calculated: C, 49.06; H, 5.38; N, 13.25; found: C, 48.80; H, 5.44; N, 12.99.

EXAMPLE 4

2-(2-Amino-4-Chlorophenyl)-2-Imidazoline-1-Propionic Acid Methyl Ester, Hydrochloride Reflux 2-(2-amino-4-chlorophenyl)-2-imidazoline (3.9 g.) with acrylamide (2.2 g.) in 4 ml. water and 2 ml. concentrated hydrochloric acid for 4–5 hours. Cool. Make basic with ammonium hydroxide; extract with dichloromethane. Remove water from the aqueous. Dissolve the solid in 250 ml. methanol, add 50 ml. concentrated hydrochloric acid and reflux overnight. Remove solvent in vacuo. Cool in ice bath and add ammonium hydroxide until pH 8. Extract with dichloromethane. Wash and dry. Evaporate the solvent in vacuo. Dissolve the material in benzene and filter through a column of Florex. Remove the solvent from the filtrate in vacuo. Residue weighed 2.5 g.

Suspend 1.0 g. in methanol. Add isopropanolic hydrogen chloride. Filter through cotton. Add excess ether. Filter and dry the crystals to get 2-(2-amino-4-chlorophenyl)-2-imidazoline-1-propionic acid methyl ester, hydrochloride (1.05 g.), m.p. 218°–222° (d) $\lambda_{max}^{KBr}$ 3.3, 3.4, 5.75, 6.3 μ.

Analysis for: $C_{13}H_{16}N_3ClO_2 \cdot HCl$; Calculated: C, 49.06; H, 5.38; N, 13.25; Found: C, 49.22; H, 5.45; N, 13.50.

EXAMPLE 5

2-(2-Amino-4-Chlorophenyl)-2-Imidazoline-1-Propionic Acid, Hydrochloride

Reflux 2-(2-amino-4-chlorophenyl)-2-imidazoline (8.0 g.) and acrylamide (4.4 g.) in 8 ml. water and 4 ml. concentrated hydrochloric acid for 6 hours. Make basic with dilute sodium hydroxide solution and extract with dichloromethane. Make aqueous acidic with dilute hydrochloric acid. Remove the water in vacuo. Esterify the residue as in Example 3. Dissolve the ester (1.2 g.) in methanol (50 ml.). Add 1.3 g. of sodium hydroxide and reflux for 3 hours. Cool. Remove methanol in vacuo. Dissolve in water and extract with dichloromethane. Filter aqueous through Supercel and make acidic with concentrated hydrochloric acid (around 150 ml.) while cooling in ice. Filter to collect the product, 2-(2-amino-4-chlorophenyl)-2-imidazoline-1-propionic acid, hydrochloride, 1.38 g., m.p. 258°–259°, $\lambda_{max}^{KBr}$ 3.2, 3.4, 5.75, 6.2 μ.

Analysis for: $C_{12}H_{14}N_3OCl \cdot HCl$; calculated: C, 47.39; H, 4.97; N, 13.81; found: C, 47.06; H, 5.01; N, 14.15.

The subject matter which the applicant regards as his invention is particularly pointed out and distinctly claimed as follows:

1. A compound of the formula:

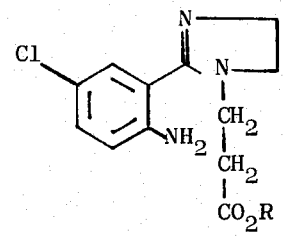

wherein R is hydrogen or alkyl of from 1 to 6 carbon atoms, and the pharmacologically acceptable addition salts thereof.

2. The compounds of claim 1 of the formula:

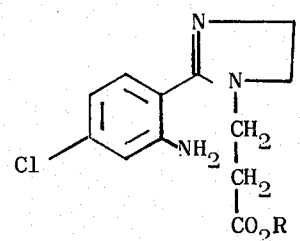

wherein R is hydrogen or alkyl of from 1 to 6 carbon atoms, and the pharmacologically acceptable addition salts thereof.

3. The compounds of claim 1 of the formula:

wherein R is hydrogen or alkyl of from 1 to 6 carbon atoms, and the pharmacologically acceptable addition salts thereof.

4. The compound of claim 1 which is 2-(2-amino-5-chlorophenyl)-2-imidazoline-1-propionic acid and the pharmacologically acceptable addition salts thereof.

5. The compound of claim 1 which is 2-(2-amino-5-chlorophenyl)-2-imidazoline-1-propionic acid, methyl ester and the pharmacologically acceptable acid addition salts thereof.

6. The compound of claim 1 which is 2-(2-amino-4-chlorophenyl)-2-imidazoline-1-propionic acid, methyl ester and the pharmacologically acceptable acid addition salts thereof.

7. The compound of claim 1 which is 2-(2-amino-4-chlorophenyl)-2-imidazoline-1-propionic acid and the pharmacologically acceptable addition salts thereof.

* * * * *